Patented Apr. 13, 1943

2,316,197

UNITED STATES PATENT OFFICE 2,316,197

POLYVINYL HALIDE COMPOSITION

Harold Tucker, Cuyahoga Falls, Ohio, assignor to The B. F. Goodrich Company, New York, N. Y., a corporation of New York No Drawing. Application January 16, 1941,
Serial No. 374,699

7 Claims. (Cl. 260—32)

This invention relates to polyvinyl halide compositions and pertains specifically to heat-stabilizers for plasticized polyvinyl halide compositions.

Resilient plasticized compositions of polymers made largely from a vinyl halide, such as gamma-polyvinyl chloride, polyvinyl bromide, or copolymers of vinyl chloride with minor proportions of vinyl esters such as vinyl acetate or vinyl cyanide, or of vinylidene chloride are well known to be useful as chemically resistant protective coatings. Articles protected with these materials are resistant to acids, alkalies, oxidizing and reducing agents, water, oil, and many other reagents which have a deleterious effect upon other commonly used resilient materials such as rubber.

One of the common methods of application of these plastic compositions is by dipping the article to be coated in a solution of the material in a suitable solvent, such as methyl ethyl ketone, mesityl oxide, chlorobenzene, chlorotoluene, dichlorobenzene, trichlorobenzene, etc. In applying relatively thick coatings to metallic articles it has been found desirable to use a chlorinated aromatic hydrocarbon solvent, such as chlorobenzene or chlorotoluene, rather than one of the other possible solvents because of the higher gel point of the former, which permits the formation of a thicker coating after an equal number of dips at the same temperature. The solutions employed, because of their high solids content, are usually gels at room temperature and so must be heated to about 70° to 90° C. for the dipping process. At these temperatures, however, in the presence of certain metals, notably zinc, iron, copper, and brass, the polymer solution undergoes a slow gelation process, often accompanied by a discoloration, which requires from about three to twenty days depending upon the exact temperature at which the solution is kept. This gelation, or "setting up" of the solution renders it unfit for use and cannot be remedied, once it has occurred, by any device known. Since many of the articles which could advantageously be coated with the above polymers, such as racks for metal plating baths, acid containers, etc., frequently contain at least a small proportion of one of the above metals, the solutions may be used for only a limited time before being discarded, instead of being employed continuously or intermittently over a long period of time.

I have now discovered that the addition of a small amount of a hydroxy derivative of quinoline or isoquinoline such as 8-hydroxyquinoline, carbostyril, 3,8-dihydroxyquinoline, betahydroxyisoquinoline, and the like greatly retards the gelation and decomposition of such solutions.

Extremely small amounts of these stabilizers are effective in retarding the decomposition, but larger amounts, up to the limit of the solubility of the compound in the polymer solution produce no harmful results. In general, I prefer to use from 0.1% to 1.0% of the stabilizer by weight, based on the weight of the solution.

As a specific example of my invention I have prepared a solution containing 6.75 parts by weight of gamma polyvinyl chloride, 2.25 parts of tricresyl phosphate, 0.3 part of 8-hydroxyquinoline, and 91 parts of chlorobenzene. This solution showed signs of decomposing only after heating for four months at about 102° to 130° C., whereas a similar solution containing no stabilizer had completely gelled after eighteen days. Similar results may be obtained with other compounds in the same class.

My new stabilizers may be used with any polymer in which the predominant constituent is vinyl chloride, such as alpha, beta, or gamma polyvinyl chloride and copolymers of vinyl chloride with minor proportions of vinyl acetate, vinyl cyanide, vinylidene chloride, and the like. Any of the ordinary plasticizers, among which are tricresyl phosphate, dibutyl phthalate, butyl phthalyl butyl glycollate, etc., may be used in these compositions, as well as any of the common pigments and fillers, such as barytes, clay, whiting, etc. Dyes, softeners, and other ingredients may be added to obtain special effects.

Although I have herein disclosed specific examples of my invention, I do not intend to limit myself solely thereto, but only as indicated by the spirit and scope of the appended claims.

I claim:

1. A composition comprising a polymer of which the predominant constituent is vinyl chloride, a chlorinated aromatic hydrocarbon solvent, and a member of the class consisting of quinoline and isoquinoline in which at least one hydrogenation has been replaced by an hydroxyl group.

2. A composition comprising a polymer of which the predominant constituent is vinyl chloride, a chlorinated hydrocarbon solvent, and 8-hydroxyquinoline.

3. A composition comprising gamma polyvinyl chloride, a chlorinated aromatic hydrocarbon solvent, and a member of the class consisting of quinoline and isoquinoline in which at least one hydrogen atom has been replaced by an hydroxyl group.

4. A composition comprising a polymer of which vinyl chloride is the predominant constituent, chlorobenzene, and 8-hydroxyquinoline.

5. A composition comprising gamma polyvinyl chloride, a chlorinated hydrocarbon solvent, and 8-hydroxyquinoline.

6. A composition comprising gamma polyvinyl chloride, chlorobenzene, and 8-hydroxyquinoline.

7. A composition comprising gamma polyvinyl chloride, chlorotoluene, and 8-hydroxyquinoline.

HAROLD TUCKER.

CERTIFICATE OF CORRECTION.

Patent No. 2,316,197.  April 13, 1943.

HAROLD TUCKER.

It is hereby certified that error appears in the printed specification of the above numbered patent requiring correction as follows: Page 1, second column, line 46, claim 1, for "hydrogenation" read --hydrogen atom--; and that the said Letters Patent should be read with this correction therein that the same may conform to the record of the case in the Patent Office.

Signed and sealed this 13th day of July, A. D. 1943.

Henry Van Arsdale,
Acting Commissioner of Patents.

(Seal)

CERTIFICATE OF CORRECTION.

Patent No. 2,316,197.  April 13, 1943.

HAROLD TUCKER.

It is hereby certified that error appears in the printed specification of the above numbered patent requiring correction as follows: Page 1, second column, line 46, claim 1, for "hydrogenation" read --hydrogen atom--; and that the said Letters Patent should be read with this correction therein that the same may conform to the record of the case in the Patent Office.

Signed and sealed this 13th day of July, A. D. 1943.

Henry Van Arsdale,
Acting Commissioner of Patents.

(Seal)